(12) United States Patent
Jiang

(10) Patent No.: US 9,985,294 B2
(45) Date of Patent: May 29, 2018

(54) HIGH ENERGY DENSITY AND HIGH RATE LI BATTERY

(71) Applicant: Pacesetter, Inc., Sunnyvale, CA (US)

(72) Inventor: Xiaofei Jiang, Clemson, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 115 days.

(21) Appl. No.: 14/725,309

(22) Filed: May 29, 2015

(65) Prior Publication Data

US 2016/0351897 A1   Dec. 1, 2016

(51) Int. Cl.
| H01M 4/36 | (2006.01) |
| H01M 4/66 | (2006.01) |
| H01M 4/04 | (2006.01) |
| H01M 4/48 | (2010.01) |
| H01M 4/54 | (2006.01) |
| H01M 4/133 | (2010.01) |
| H01M 4/1393 | (2010.01) |

(52) U.S. Cl.
CPC ............. *H01M 4/66* (2013.01); *H01M 4/661* (2013.01); *H01M 4/663* (2013.01); *H01M 4/667* (2013.01); *H01M 4/0402* (2013.01); *H01M 4/0404* (2013.01); *H01M 4/0485* (2013.01); *H01M 4/133* (2013.01); *H01M 4/1393* (2013.01); *H01M 4/48* (2013.01); *H01M 4/54* (2013.01)

(58) Field of Classification Search
CPC ............. H01M 4/0402; H01M 4/0404; H01M 4/0485; H01M 4/133; H01M 4/1393; H01M 4/48; H01M 4/54; H01M 4/66; H01M 4/661; H01M 4/663; H01M 4/667

USPC ......................................... 429/219
See application file for complete search history.

(56) References Cited

U.S. PATENT DOCUMENTS

| 4,310,609 A | 1/1982 | Liang et al. |
| 4,964,877 A | 10/1990 | Keister et al. |
| 5,114,810 A | 5/1992 | Frysz et al. |
| 5,154,989 A | 10/1992 | Howard et al. |
| 5,154,992 A | 10/1992 | Berberick et al. |
| 5,180,642 A | 1/1993 | Weiss et al. |
| 5,624,767 A | 4/1997 | Muffeletto et al. |
| 5,639,577 A | 6/1997 | Takeuchi et al. |
| 5,667,916 A | 9/1997 | Ebel et al. |

(Continued)

FOREIGN PATENT DOCUMENTS

| CN | 101393984 | * 3/2009 | ............. H01M 4/06 |
| WO | 02/49718 | 6/2002 | |

OTHER PUBLICATIONS

English machine translation of Xiaowei Yang et. (CN 101393984 (A)—Mar. 25, 2009.*

*Primary Examiner* — Mark F. Huff
*Assistant Examiner* — Omar M Kekia
(74) *Attorney, Agent, or Firm* — Theresa A. Raymer

(57) ABSTRACT

A battery includes an anode, an electrolyte, and a cathode. The cathode includes a current collector having a first surface and a second surface opposite the first surface, a first material layer comprising sub-fluorinated carbon fluoride ($CF_x$), and a second material layer comprising silver vanadium oxide (SVO) bonded to the first material layer. The first material layer comprising $CF_x$ may also be bonded to a third material layer comprising SVO, and the third material layer is bonded to the first surface of the current collector.

20 Claims, 11 Drawing Sheets

(56) References Cited

U.S. PATENT DOCUMENTS

| | | | |
|---|---|---|---|
| 5,744,256 A | 4/1998 | Bai et al. | |
| 6,009,348 A | 12/1999 | Rorvick et al. | |
| 6,017,656 A | 1/2000 | Crespi et al. | |
| 6,327,498 B1 | 12/2001 | Kroll | |
| 6,535,762 B1 | 3/2003 | Mouchawar | |
| 6,607,861 B2 | 8/2003 | Gan et al. | |
| 6,650,942 B2 | 11/2003 | Howard et al. | |
| 2001/0044047 A1* | 11/2001 | Gan | H01M 4/131 429/219 |
| 2003/0065366 A1 | 4/2003 | Merritt et al. | |
| 2003/0088273 A1 | 5/2003 | Liu et al. | |
| 2007/0072075 A1* | 3/2007 | Gan | H01M 4/06 429/209 |
| 2008/0286651 A1* | 11/2008 | Neudecker | H01M 4/0404 429/209 |
| 2010/0310908 A1* | 12/2010 | Zhang | H01M 4/364 429/90 |
| 2011/0281160 A1* | 11/2011 | Doi | H01M 10/0413 429/211 |
| 2012/0088164 A1* | 4/2012 | Foster | H01M 12/06 429/405 |
| 2015/0311532 A1* | 10/2015 | Chen | H01M 4/625 429/213 |

* cited by examiner

HIGH ENERGY DENSITY AND HIGH RATE LI BATTERY

FIELD

The present systems and methods relate to the design and method of making batteries for use within implantable medical devices.

BACKGROUND

Batteries with high energy density and high discharge rate capabilities are desirable for certain applications. This is especially true when the batteries are used in devices where the batteries are difficult to replace and/or recharge, such as in an implantable medical device (IMD). An end-of-life (EOL) indicator for the battery may also be an important feature for this kind of application. A silver vanadium oxide (SVO) cathode material offers high discharge rate capability and a good EOL indicator because of its sloped discharge voltage curve. Sub-fluorinated carbon fluoride ($CF_x$) offers higher energy density, but it has low discharge rate capability and no EOL indicator.

There have been some attempts to produce a $CF_x$/SVO hybrid battery. For example, a three-layer sandwiched design has been proposed having two SVO outer layers and one $CF_x$ center layer with a current collector in-between each SVO/$CF_x$ interface. A drawback of this design is its low packing efficiency, as two layers of current collector are needed for each cathode plate. Another design includes a mixed chemistry cathode, where the $CF_x$ and SVO are physically blended together and treated as one material bonded to a current collector. This design suffers from a lower discharge rate capability compared to an SVO-only cathode material.

SUMMARY

Embodiments of a device battery, and methods for fabricating the battery are described herein.

In an embodiment, a battery includes an anode, an electrolyte, and a cathode. The cathode includes a current collector having a first surface and a second surface opposite the first surface, a first material layer including sub-fluorinated carbon fluoride ($CF_x$), and a second material layer including silver vanadium oxide (SVO) and bonded to the first material layer.

In another embodiment, a battery cathode includes a current collector having a first surface and second surface opposite the first surface. The battery cathode also includes a first material layer including sub-fluorinated carbon fluoride ($CF_x$), and a second material layer including silver vanadium oxide (SVO) and bonded to the first material layer.

In another embodiment, a battery cathode includes a current collector having a first surface and second surface opposite the first surface. The battery cathode also includes a first material layer that includes sub-fluorinated carbon fluoride ($CF_x$), and a second material that includes silver vanadium oxide (SVO). The second material fills a plurality of bores that extend through a thickness of the first material layer.

In another embodiment, a method of fabricating a cathode includes forming a composite by bonding a first material layer comprising sub-fluorinated carbon fluoride ($CF_x$) to a second material layer comprising silver vanadium oxide (SVO) and bonding the composite to a current collector such that a surface of the current collector is contacted with the first material layer.

BRIEF DESCRIPTION OF THE FIGURES

The accompanying drawings, which are incorporated herein and form part of the specification, illustrate the devices and methods presented herein. Together with the detailed description, the drawings further serve to explain the principles of, and to enable a person skilled in the relevant art(s) to make and use, the methods and systems presented herein.

In the drawings, like reference numbers indicate identical or functionally similar elements. Further, the drawing in which an element first appears is typically indicated by the leftmost digit(s) in the corresponding reference number.

DETAILED DESCRIPTION

The following detailed description of the devices and methods refers to the accompanying drawings that illustrate exemplary embodiments consistent with these devices and methods. Other embodiments are possible, and modifications may be made to the embodiments within the spirit and scope of the methods and systems presented herein. Therefore, the following detailed description is not meant to limit the methods and systems described herein. Rather, the scope of these methods and systems is defined by the appended claims.

Exemplary Environment

Before describing in detail the design and method of making electrodes of a battery, it is helpful to describe an example environment in which such a battery may be implemented. The battery embodiments described herein may be particularly useful in the environment of an IMD such as an implantable cardiac device (ICD). Examples of such ICDs may be found in U.S. Pat. Nos. 6,327,498 and 6,535,762, each of which is incorporated herein by reference.

Battery Design

An ICD, such as those described in the patents identified above, requires some form of power source in order to operate. A primary lithium battery may be used to provide a high current output power source.

Figure 1:
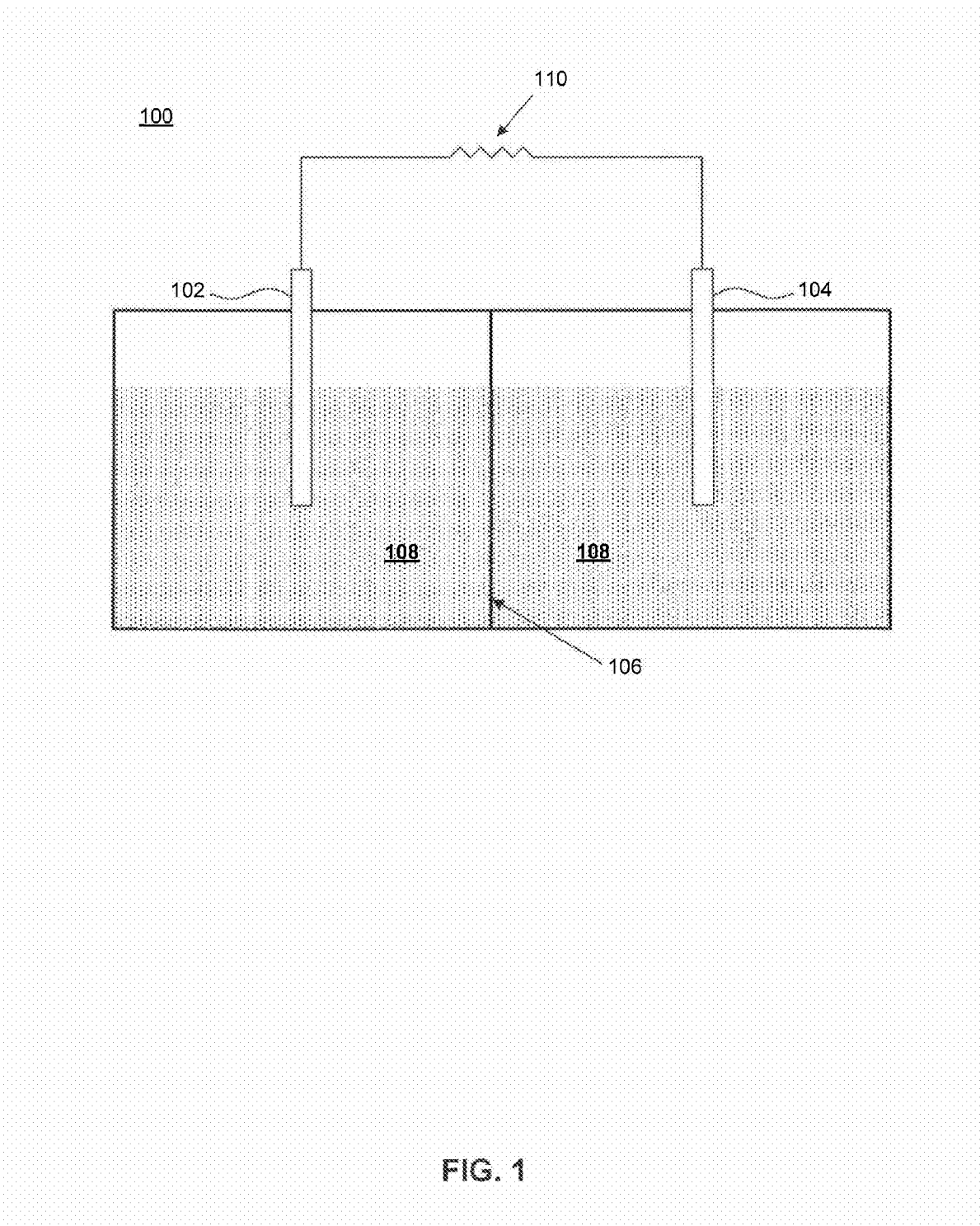
FIG. 1 illustrates a battery configuration.

FIG. 1 illustrates an example design for a battery 100. Battery 100 includes a cathode 102, an anode 104 separated from the cathode via a separator 106, and some form of electrolyte 108 in contact with anode 104 and cathode 102. The various battery elements illustrated in FIG. 1 are provided for representative purposes only and are not intended to limit the structural design of the battery embodiments herein.

Separator 106 may be configured such that ions may pass through separator 106 between anode 104 and cathode 102. An example of separator 106 includes a polyethylene film. Electrolyte 108 may be in liquid form or as a solid or semi-solid polymer in contact with anode 104 and cathode 102.

Figure 2:
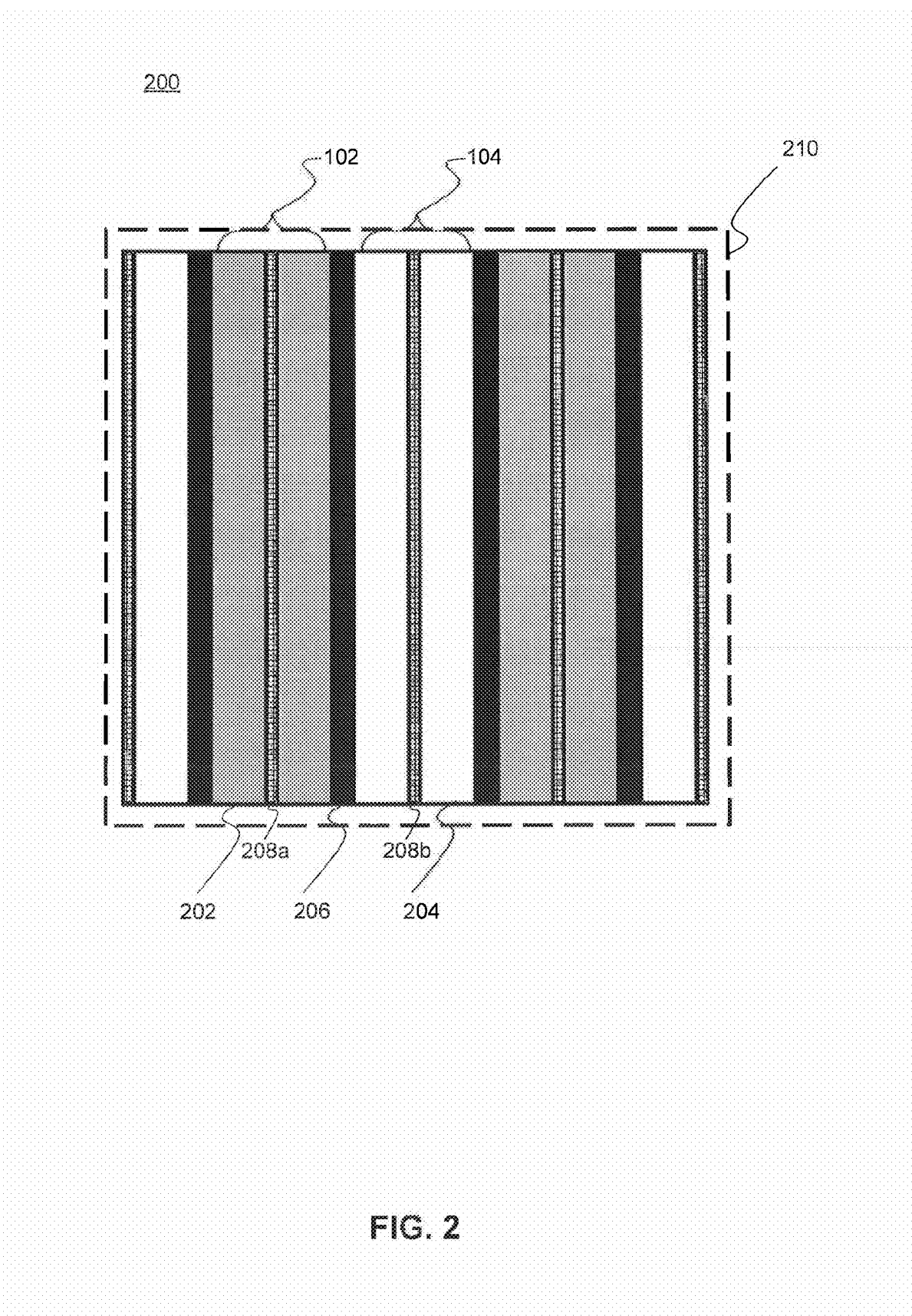
FIG. 2 illustrates a battery configuration, according to an embodiment.

Each of anode 104 and cathode 102 may include some active material bonded to a current collector (see FIG. 2). The active materials take part in the electrochemical reaction to produce the current, while the current collectors are conductive materials that provide a low-resistance path for the current to flow. For example, anode 104 may include a lithium foil bonded to a current collector while cathode 102 may include some metal oxide material (such as silver vanadium oxide) mixed with other additives (such as carbon black or graphite) and a binder material (such as polyvinylidene difluoride (PVDF) or polytetrafluoroethylene (PTFE)) and bonded to a current collector. These types of materials may be used to make a lithium battery.

The current from battery 100 is typically delivered to a load 110. The size of load 110 affects the amount of current that flows between anode 104 and cathode 102.

FIG. 2 illustrates another example design for a battery 200, according to an embodiment. Battery 200 includes a stacked structure of alternating cathode material 202 and anode material 204, separated by a separator 206. Each layer of cathode material 202 is bonded to a cathode current collector 208a, while each layer of anode material 204 is bonded to an anode current collector 208b. The stacked layers are enclosed within an insulating housing 210. Although not explicitly shown in FIG. 2, an electrolyte would also exist around cathode material 202 and anode material 204 to facilitate the ion transport between the anode and cathode materials. The electrolyte may be a polymer or liquid electrolyte as would be understood to one skilled in the art. Examples of the electrolyte include lithium bis-trifluoromethanesulfonimide (LiTFSI) in propylene carbonate/dimethoxyethane or Lithium hexafluoroarsenate ($LiAsF_6$) in propylene carbonate/dimethoxyethane. The stacked combination of cathode material 202 and cathode current collector 208a constitutes a cathode 102 of battery 200 while the stacked combination of anode material 204 and anode current collector 208b constitutes an anode 104 of battery 200.

Cathode current collectors 208a may be electrically connected together to form the positive terminal of battery 200 (cathode), while anode current collectors 208b may be connected together to form the negative terminal of battery 200 (anode). In one embodiment, anode material 204 comprises a lithium foil, and cathode material 202 comprises a metal oxide material. Separator 206 may be polyethylene. A typical battery 200 using lithium anode material 204 and silver vanadium oxide cathode material 202 has an operating voltage between 3.2 and 2.35 V with a cathode capacity of 315 mAh/g. In various embodiments described herein, cathode material 202 includes a layer of sub-fluorinated carbon fluoride and a layer of silver vanadium oxide.

Figure 3A:
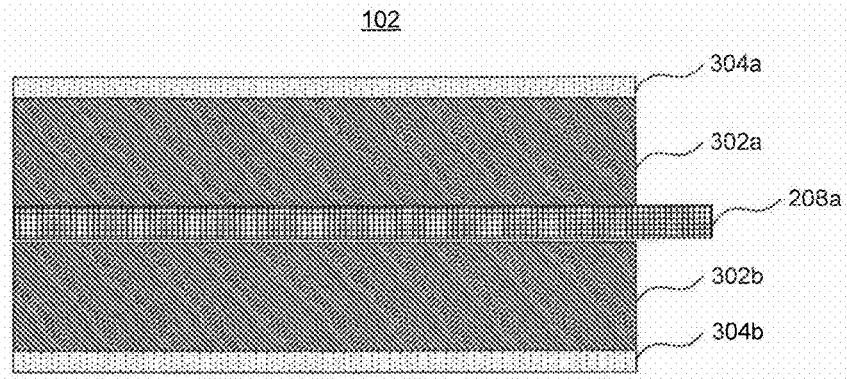
FIGS. 3A, 3B and 3C illustrate views of battery cathode configurations, according to embodiments.

FIG. 3A illustrates a cross section of cathode 102 showing the various material layers, according to an embodiment. Cathode 102 includes a cathode current collector 208a, a first material layer 302a/302b and a second material layer 304a/304b. First material layer 302a may include the same material as first material layer 302b. Similarly, second material layer 304a may include the same material as second material layer 304b. For brevity, only first material layer 302a and second material layer 304a are described, but it should be understood that the description equally applies to first material layer 302b and second material layer 304b.

First material layer 302a includes sub-fluorinated carbon fluoride ($CF_x$), according to an embodiment. For example, x may be in the range between 0.6 and 1.2. In one particular example, x is equal to about 1.1. To increase the conductivity of first material layer 302a, an additive may be mixed with the $CF_x$ material before forming the layer. The additive may include, for example, one or more of carbon nanotubes, carbon black, graphene, or metal nanoparticles. For example, 1% to 20% by weight, 5% to 10% by weight, or about 5% by weight of silver nano-particles with a surface area around 20 $m^2$ are added to the $CF_x$ material to improve the conductivity of the $CF_x$. In another example, 1% to 20% by weight, 5% to 10% by weight, or about 5% by weight of aluminum nano-particles with a surface area around 50 $m^2$ are added to the $CF_x$ material to improve the conductivity of the $CF_x$.

Second material layer 304a includes silver vanadium oxide (SVO), according to an embodiment. Second material layer 304a is bonded to a surface of first material layer 302a, while an opposite, second surface of first material layer 302a is bonded to cathode current collector 208a. Second material layer 304a is preferably thinner than first material layer 302a. In one example, second material layer 304a is about one third the thickness of first material layer 302a. In one specific example embodiment, first material layer 302a may have a thickness around six thousandths of an inch. In this example, second material layer 304a has a thickness of around two thousandths of an inch.

Figure 3B:
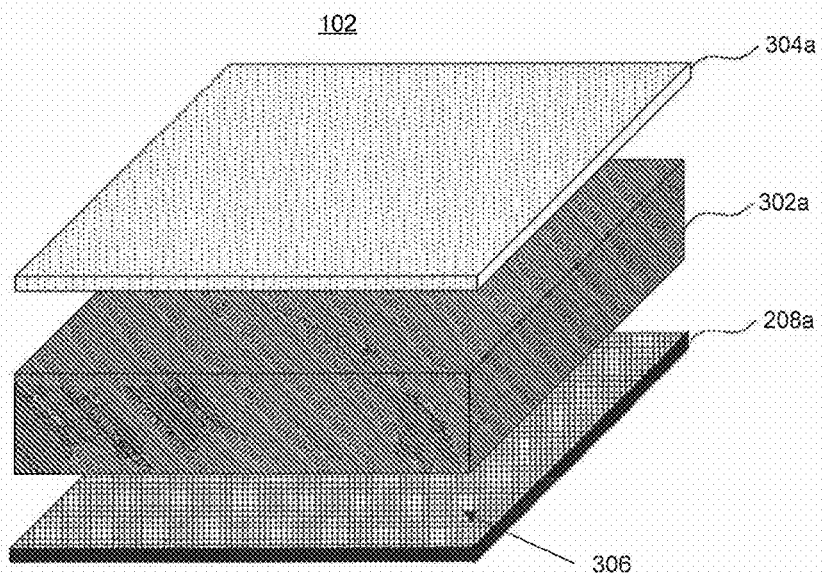

Cathode current collector 208a may be any suitable conductive material to allow a current to flow. For example, cathode current collector 208a may be formed from a metal. In one particular example, cathode current collector 208a is fabricated from aluminum, and anode current collector 208b (FIG. 2) is fabricated from nickel. In one embodiment, cathode current collector 208a has a mesh structure across its largest face. FIG. 3B illustrates a three-dimensional view of a portion of cathode 102 showing current collector 208a and its mesh 306. First material layer 302a is pressed onto mesh 306 with second material layer 304a bonded to first material layer 302a. In an embodiment, the pressing of first material layer 302a and first material layer 302b to cathode current collector 208a causes both material layers to bond together through mesh 306. Cathode current collector 208a may be photolithographically etched to form mesh 306. Other examples of cathode current collector 208a include a foil or an expanded metal.

In an embodiment, mesh 306 has a thickness around three thousandths of an inch with an array of equidistant bores extending through the thickness. Each bore may have an area around 0.055 inches squared with a spacing between bores of around eight thousands of an inch. The bores themselves may be any shape. In one embodiment, each bore in mesh 306 has a quadrilateral shape.

Figure 3C:
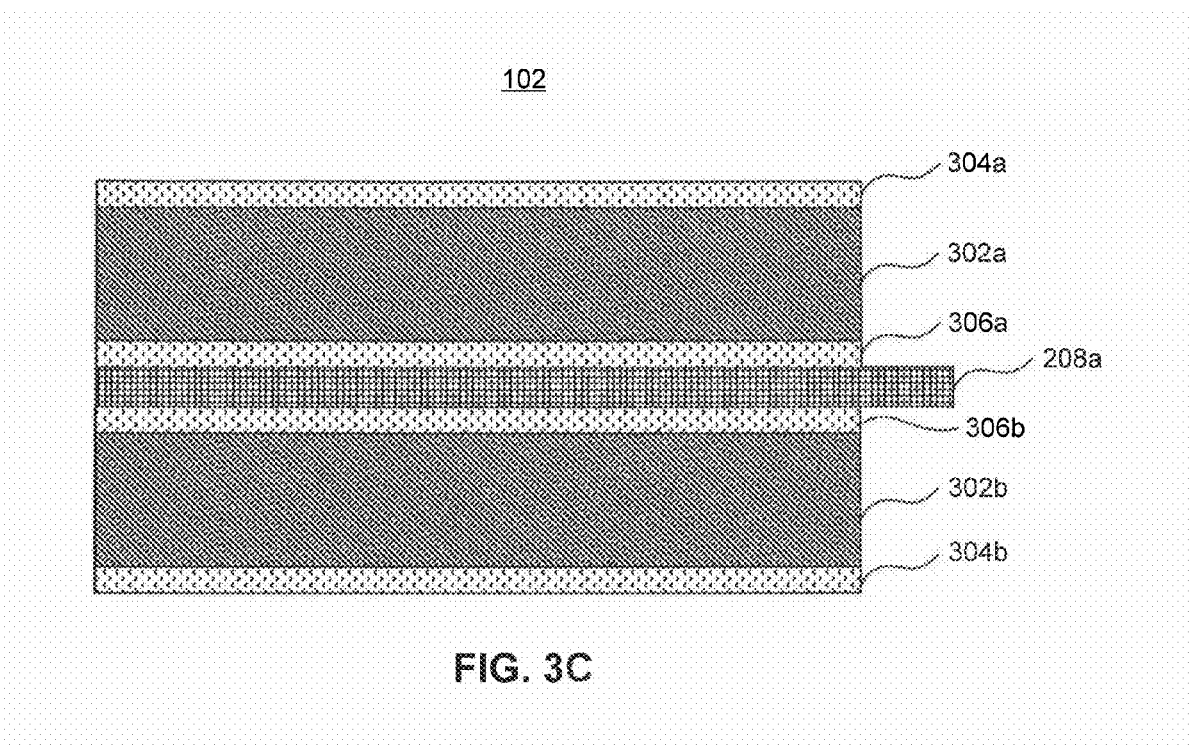

FIG. 3C illustrates an alternate embodiment where cathode 102 includes first material layer 302a/302b, second material layer 304a/304b, and a third material layer 306a/306b. First material layer 302a is bonded to a surface of third material layer 306a, while an opposite second surface of third material layer 306a is bonded to cathode current collector 208*a*. In one example, third material layer 306*a*/306*b* includes the same material as second material layer 304*a*/304*b*.

Any of the cathode layer embodiments may exhibit design modifications without deviating from the scope or spirit of the described embodiments. For example, the layer designs may be modified by introducing vertical plugs of silver vanadium oxide that penetrate through the various material layers, or vertical layers of silver vanadium oxide. These plugs or vertical layers may be added using techniques such as 3D printing, screen printing, etc.

Figure 4:
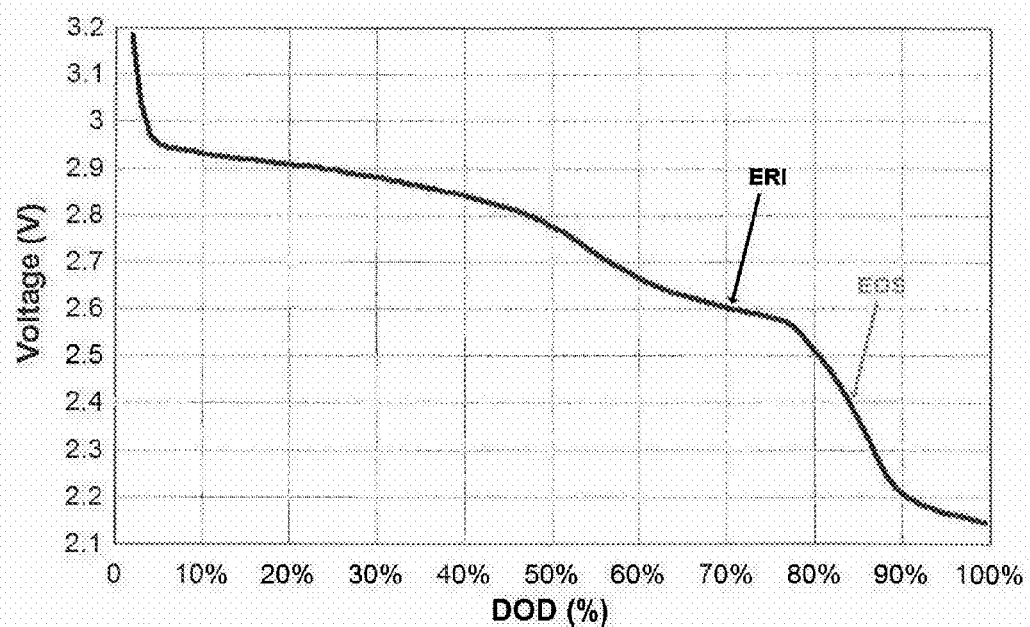
FIG. 4 illustrates a discharge curve of a battery, according to an embodiment.

The embodiments of batteries described in this application exhibit high energy density and discharge rate. In addition, the batteries include an end-of-life EOL) indicator in their discharge curve. FIG. 4 illustrates a graph showing an example discharge curve for a battery that includes a lithium anode and a cathode comprising $CF_x$ and SVO, according to an embodiment. The dimensions of the battery would not cause any substantial change to the graph, however, different anode or cathode materials would change the characteristics of the curve. The graph displays the voltage of the battery vs. the depth of discharge (DOD). A voltage that corresponds to an elective replacement indicator (ERI) is shown as well as a voltage that corresponds to an end-of-service (EOS) indicator. Due to the sloped discharge voltage curve as the battery nears the end of its life, the voltage provides a relatively good indicator of when the battery needs to be replaced (the ERI point). For example, when the measured potential across the battery terminals is about 2.4 V (e.g., the EOS indicator), the battery is close to being discharged to a point where it is no longer useful for reliably powering an ICD.

Methods of Fabricating an Electrode

FIGS. 5-8 provide example methods of fabricating a cathode of a battery. In one example, the anode of the battery is a lithium anode.

Figure 5:
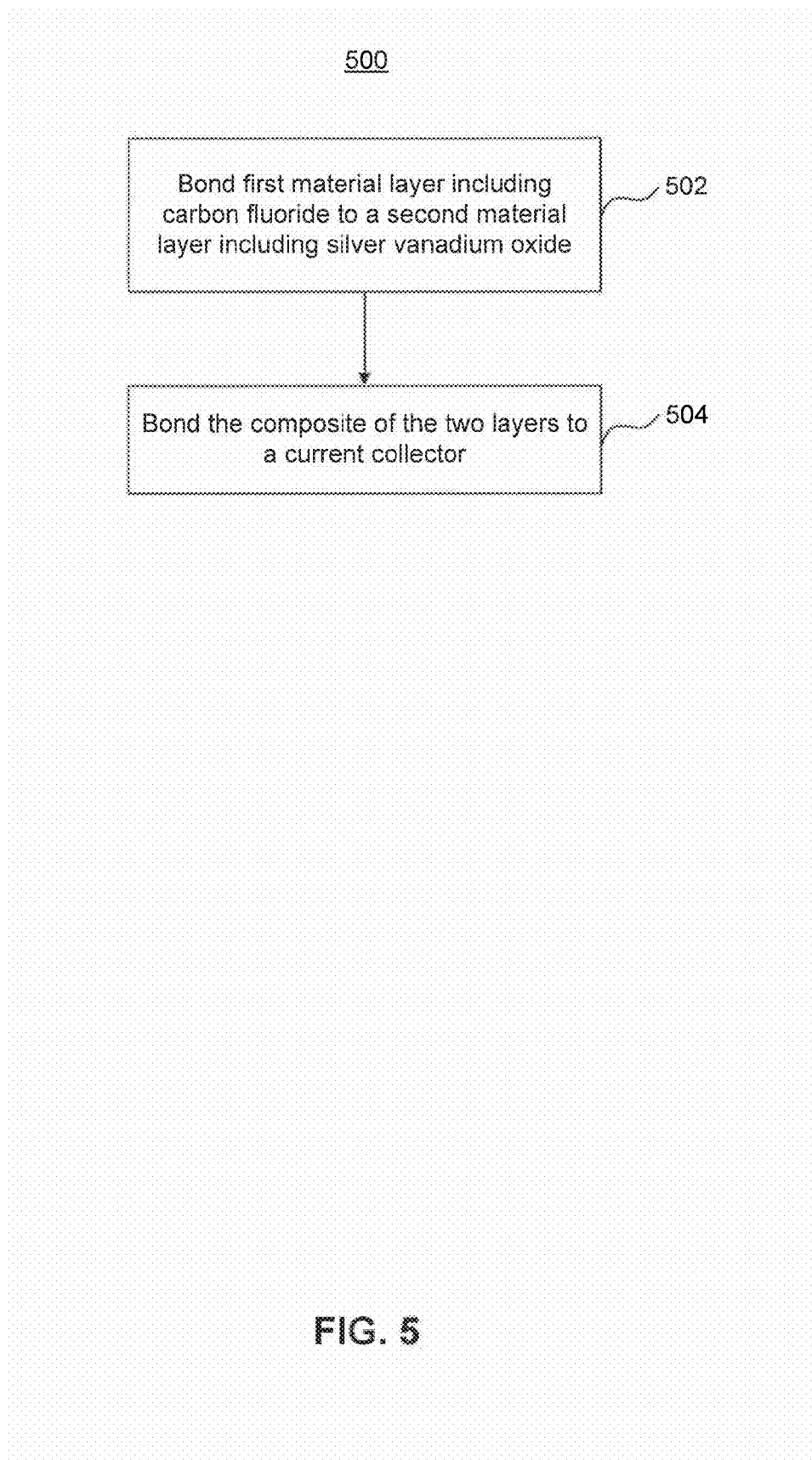
FIG. 5 illustrates a first example method for fabricating a battery electrode.

FIG. 5 illustrates a method 500 for fabricating an electrode, according to a first embodiment. Method 500 may be used to form cathode 102 as illustrated in FIG. 3A.

Method 500 starts at block 502 where a first material layer including sub-fluorinated carbon fluoride is bonded to a second material layer including silver vanadium oxide. The bonding of the first and second material layers forms a composite.

At block 504, the composite is bonded to a current collector. A substantially similar composite may be bonded to an opposite surface of the current collector. The composite may be bonded such that the first material layer comprising sub-fluorinated carbon fluoride ($CF_x$) is in contact with the current collector. Similarly, the substantially similar composite may be bonded to the opposite surface of the current collector such that a $CF_x$ layer of the substantially similar composite is in contact with the current collector.

Figure 6:
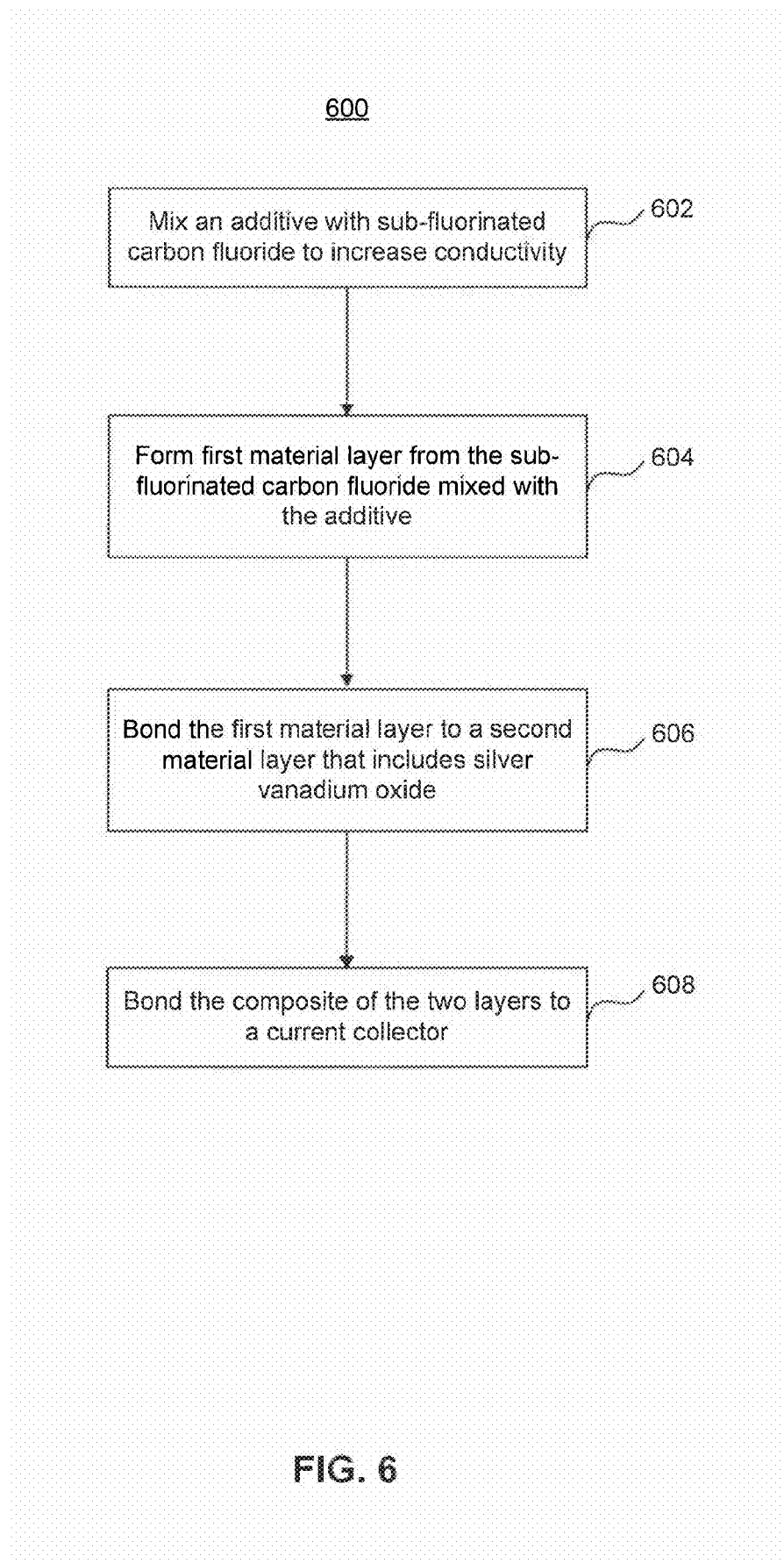
FIG. 6 illustrates a second example method for fabricating a battery electrode.

FIG. 6 illustrates a method 600 for fabricating an electrode, according to a second embodiment. Method 600 may be used to form cathode 102 as illustrated in FIG. 3A.

Method 600 starts at block 602 where an additive is mixed with sub-fluorinated carbon fluoride ($CF_x$) to increase the conductivity. The additive may include one or more of carbon nanotubes, carbon black, graphene, and metal nano-particles.

At block 604, the first material layer is formed from the sub-fluorinated carbon fluoride ($CF_x$) mixed with the additive. This step may involve any number of curing procedures. For example, the mixture may be temperature cured or allowed to sit for a period of time to harden at room temperature.

At block 606, the first material layer is bonded to a second material layer including silver vanadium oxide. The bonding of the first and second material layers forms a composite.

At block 608, the composite of the two layers is bonded to a current collector. A substantially similar composite may be bonded to an opposite surface of the current collector.

Figure 7:
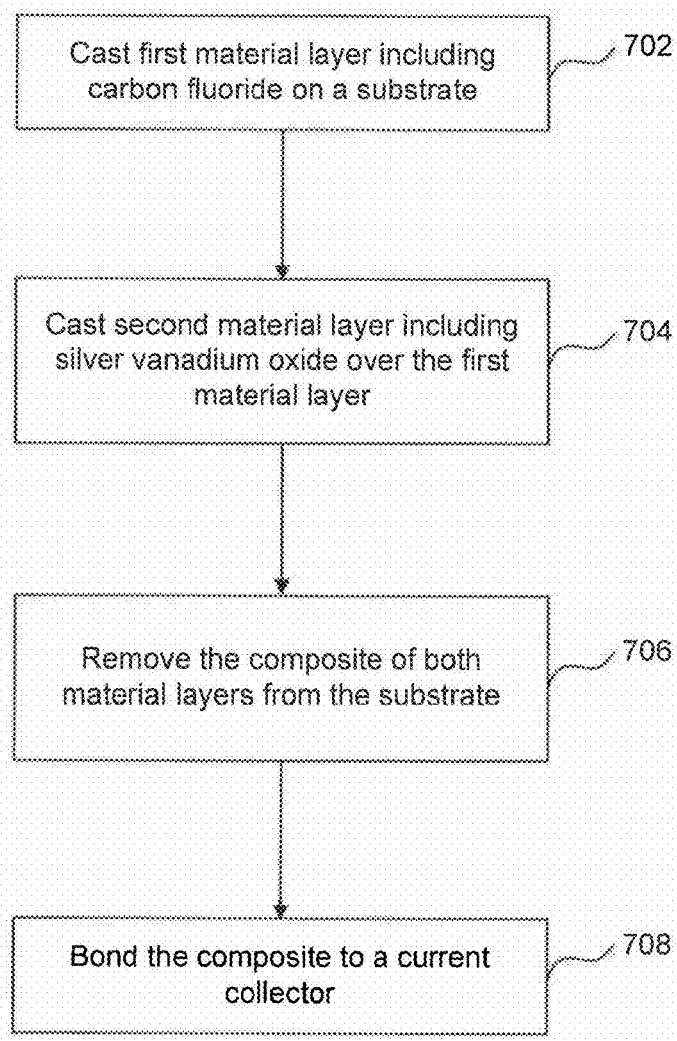
FIG. 7 illustrates a third example method for fabricating a battery electrode.

FIG. 7 illustrates a method 700 for fabricating an electrode, according to an embodiment. Method 700 may be used to form cathode 102 as illustrated in FIG. 3A.

Method 700 starts at block 702 where a first material that includes carbon fluoride is cast on a substrate. The substrate may include a flat surface, and is a material that preferably does not adhere strongly with the first material. In one example, the first material includes sub-fluorinated carbon fluoride. This casting step produces a first material layer on the substrate. Dip casting or tape casting are two example processes for casting the first material layer over the substrate.

At block 704, a second material that includes silver vanadium oxide is cast over the first material layer. This casting step produces a second material layer bonded to the first material layer. The second material layer may be substantially thinner than the first material layer. As with the first material layer, dip casting or tape casting are two example processes for casting the second material layer.

At block 706, the composite, which includes both material layers, is removed from the substrate. The substrate may include an anti-adhesion layer on its surface to facilitate the removal of the composite.

At block 708, the composite is bonded to a current collector. A substantially similar composite may be bonded to an opposite surface of the current collector.

It should be understood that the order of the layers casted onto the substrate in blocks 702 and 704 may be reversed. Thus, the second material layer including silver vanadium oxide may be casted first on the substrate, followed by the first material layer including sub-fluorinated carbon fluoride. The first and second material layers may also be directly coated on the current collector, such as an aluminum foil or aluminum mesh, by tape casting or printing methods.

Various techniques may be used to form the first and second material layers of the method described above, as would be understood by one skilled in the art. Each of the first and second material layers may be produced separately or together using a calendar sheeting process or tape casting process. The composite may be bonded to the current collector using a die press or calendar rollers. The first and second material layers may be casted or printed directly onto the current collector, dried, and then pressed using a die press or calendar rollers, according to an embodiment.

An optional step of any of methods 500, 600, or 700 includes bonding a third material layer including silver vanadium oxide to the first material layer, such that the first material layer is sandwiched between the second and third material layers. The resultant composite may be bonded to the current collector to form a cathode similar in design to that illustrated in FIG. 3C.

Figure 8:
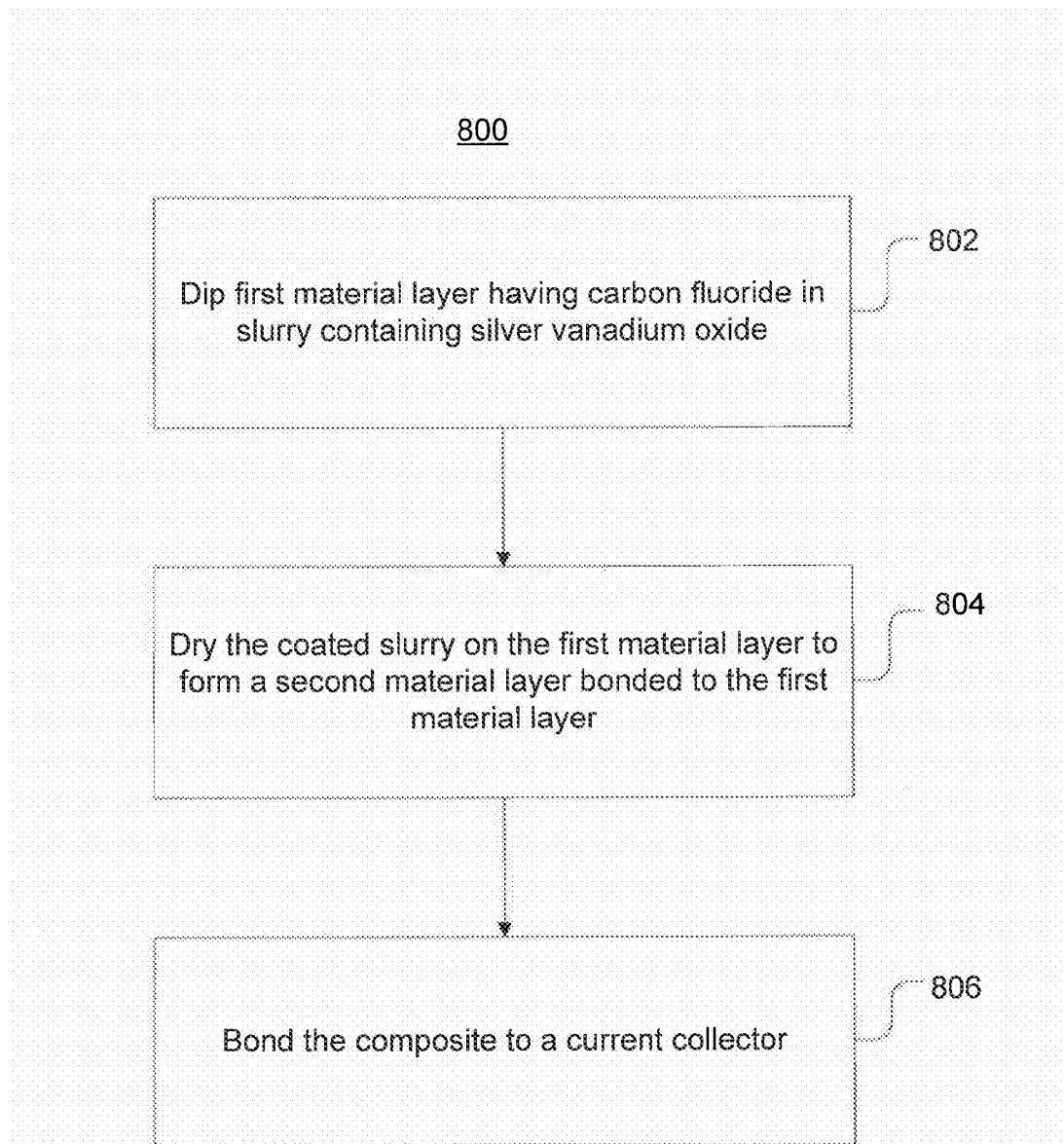
FIG. 8 illustrates a fourth example method for fabricating a battery electrode.

FIG. 8 illustrates a method 800 for fabricating an electrode, according to an embodiment. Method 800 may be used to form cathode 102 as illustrated in FIG. 3A.

Method 800 begins at block 802 where a first material layer containing sub-fluorinated carbon fluoride is dipped into a slurry containing silver vanadium oxide (i.e., dip casting.) The first material layer may include sub-fluorinated carbon fluoride. In one embodiment, the first material layer also includes an additive of metallic nano-particles, carbon nanotubes or graphene to improve the conductivity. The solid content and viscosity of the slurry will affect the thickness of the silver vanadium oxide material coated over a surface of the first material layer.

At block 804, the slurry containing the silver vanadium oxide is dried to form a second material layer bonded to the first material layer. This bonding of the two layers forms a composite.

At block 806, the composite is bonded to a current collector. A substantially similar composite may be bonded to an opposite surface of the current collector. The composites on opposite sides of the current collector may be bonded together through a mesh surface.

In another embodiment, rather than first performing a dip casting technique to form the composite followed with bonding the composite to the current collector, each layer may be formed on the current collector via a dip casting step. For example, the current collector may be dipped into a slurry containing the first material and withdrawn to allow the first material layer to form on the current collector. Next, the current collector with the bonded first material layer is dipped into a slurry containing the second material and withdrawn to allow the second material layer to form over the first material layer. In this example, the first material may include sub-fluorinated carbon fluoride, and the second material may include silver vanadium oxide.

Other Layer Designs

Figure 9A:
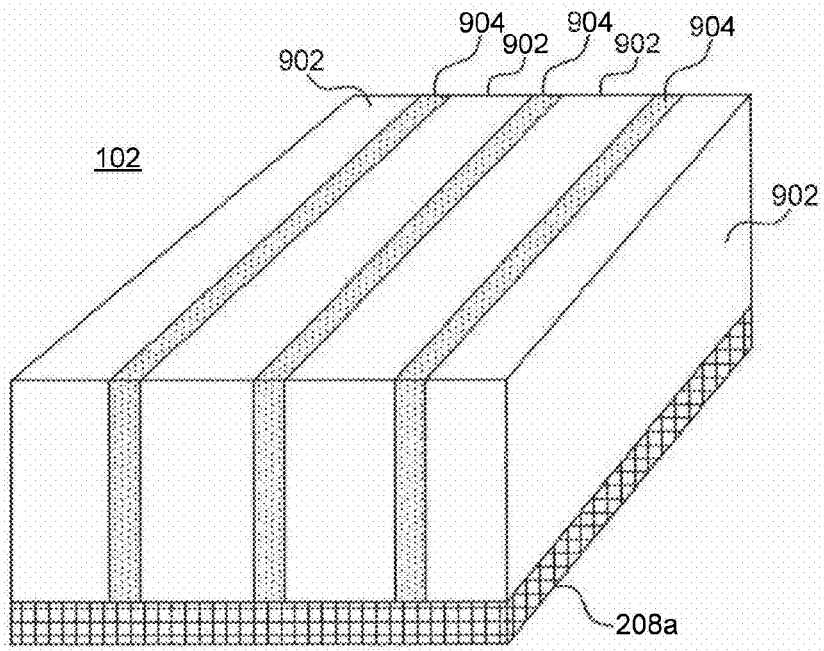
FIGS. 9A, 9B and 9C illustrate views of battery cathode configurations, according to embodiments.
Figure 9B:
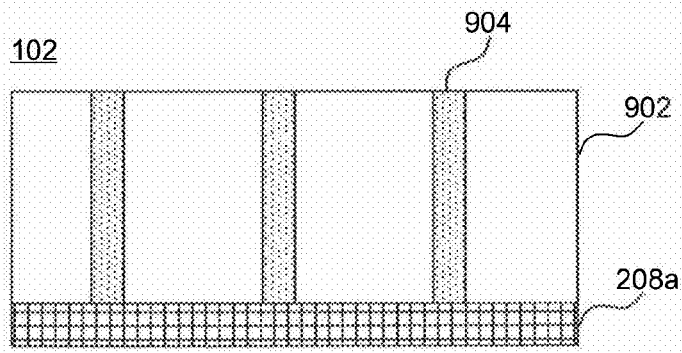
Figure 9C:
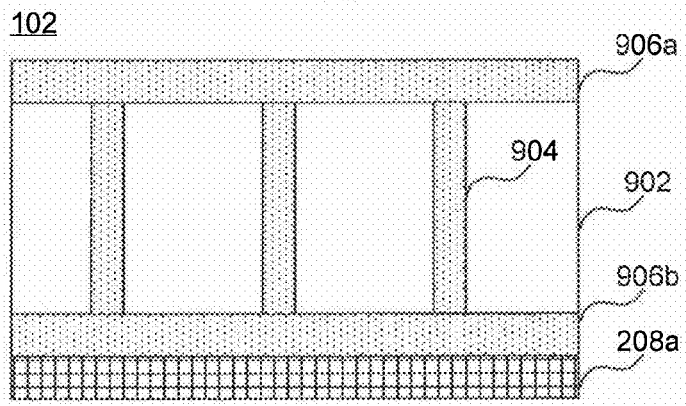

Other material layer designs are possible beyond the design illustrated in FIGS. 3A, 3B and 3C. For example, FIG. 9A illustrates a three-dimensional illustration of cathode 102 having a first material 902 and a second material 904 arranged on top of cathode current collector 208a. First material 902 and second material 904 are arranged as transversely orientated layers across the surface of cathode current collector 208a. Thus, the bond interface between first material 902 and second material 904 is oriented perpendicular to the surface of cathode current collector 208a. In one example, each layer of first material 902 is wider than each layer of second material 904. Each layer of first material 902 may be around three times as wide as each layer of second material 904. FIG. 9B illustrates a cross-section of cathode 102 illustrating the alternating first material 902 and second material 904 disposed on top of cathode current collector 208a. It should be understood that a similar arrangement would exist on the opposite side of current collector 208a as well. FIG. 9C illustrates another embodiment of cathode 102, where additional layers 906a and 906b are deposited on the top and bottom surfaces of the alternating layer stack, which includes first material 902 and second material 904. In one example, additional layers 906a and 906b are the same material as second material 904. Second material 904 may have a higher conductivity than first material 902. Thus, in this example, additional layer 906b provides a better electrical connection (e.g., lower resistance) with cathode current collector 208a.

Additional layers 906a and 906b may be deposited using any known technique in the art, such as calendar sheeting, tape casting, slip casting, etc. First material 902 and second material 904 may be bonded together using any known method in the art, such as, for example, tape casting, slot die casting, or slip casting. A layer-by-layer sandwich structure of alternating layers of first material 902 and second material 904 may be cut and rotated before being bonded to current collector 208a so that the layers run along planes that are perpendicular to the surface of cathode current collector 208a.

In an embodiment, first material 902 includes sub-fluorinated carbon fluoride ($CF_x$) while second material 904 includes silver vanadium oxide (SVO). In an embodiment, x is in the range between 0.6 and 1.2. In one particular example, x is equal to about 1.1. To increase the conductivity of material layer 902, an additive may be mixed with the $CF_x$ material before forming the layer. The additive may include, for example, one or more of carbon nanotubes, carbon black, graphene, or metal nanoparticles. For example, 1% to 20% by weight, 5% to 10% by weight, or about 5% by weight of silver nano-particles with a surface area around 20 $m^2$ are added to the $CF_x$ material to improve the conductivity of the $CF_x$. In another example, 1% to 20% by weight, 5% to 10% by weight, or about 5% by weight of aluminum nano-particles with a surface area around 50 $m^2$ are added to the $CF_x$ material to improve the conductivity of the $CF_x$.

Figure 10A:
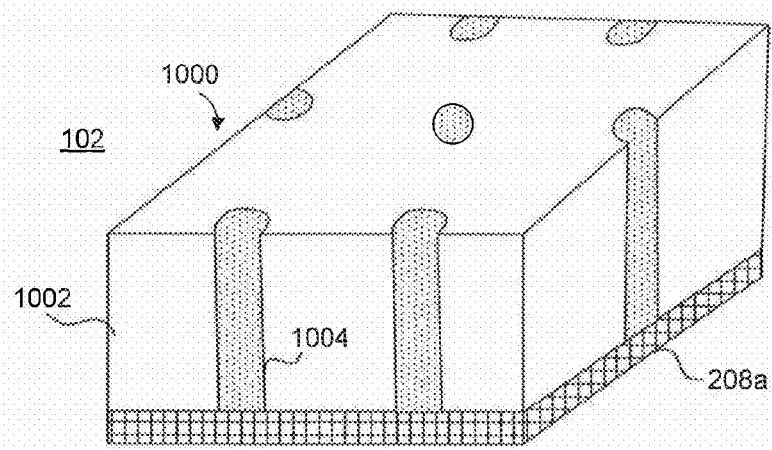
FIGS. 10A, 10B, 10C and 10D illustrate views of battery cathode configurations, according to embodiments.
Figure 10B:
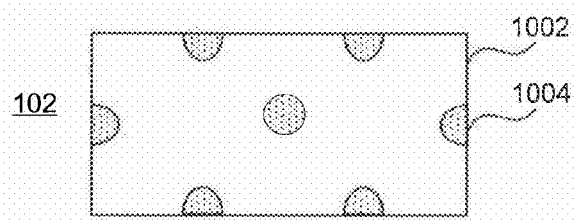
Figure 10C:
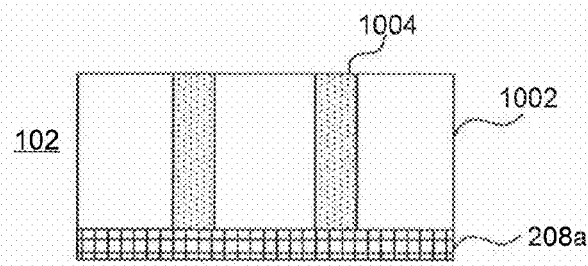
Figure 10D:
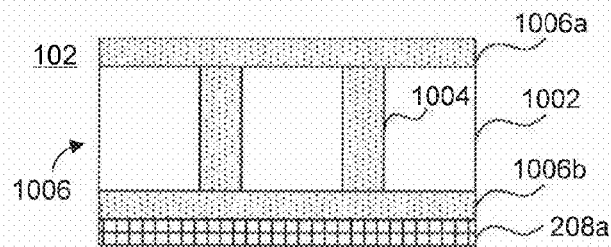

Other cathode material designs are illustrated in FIGS. 10A-10D. FIG. 10A illustrates a three-dimensional illustration of cathode 102 having a first material layer 1002 and a second material 1004, which form a composite material layer 1000, bonded on top of cathode current collector 208a. Second material 1004 is used to fill in bores (or vias) that extend through a thickness of first material layer 1002. In an embodiment, these vias are equally spaced from one another. FIG. 10B illustrates a top view of cathode 102 showing the circular bores through first material layer 1002 that are filled with second material 1004. The profile of the bores made through first material layer 1002 do not need to be circular. For example, the bores may have a triangular, rectangular, oval, or square cross-section. Other geometric shapes are possible as well without deviating from the scope or spirit of the described embodiments. FIG. 10C illustrates a cross-section of cathode 102 taken along a plane that intersects where second material 1004 extends through the thickness of first material layer 1002. FIG. 10D illustrates another embodiment where additional layers 1006a and 1006b are deposited on the top and bottom surfaces of composite material layer 1000, which includes first material 1002 and second material 1004. In one example, additional layers 1006a and 1006b are the same material as second material 1004. Second material 1004 may have a higher conductivity than first material 1002. Thus, in this example, additional layers 1006a and 1006b provide a better electrical connection (e.g., lower resistance) with cathode current collector 208a.

Additional layers 1006a and 1006b may be deposited using any known technique in the art, such as calendar sheeting, tape casting, slip casting, etc. Composite material layer 1000 may be formed using any known method in the art, such as, for example, screen printing, Gravure printing, inkjet printing, or 3D printing. In one example, the smaller features (second material 1004) may be printed first, followed with filling in the areas around them with first material layer 1002.

In an embodiment, first material layer 1002 includes sub-fluorinated carbon fluoride ($CF_x$) while second material 1004 includes silver vanadium oxide (SVO). In one embodiment, x is in the range between 0.6 and 1.2. In one particular example, x is equal to about 1.1. To increase the conductivity of first material layer 1002, an additive may be mixed with the $CF_x$ material before forming the layer. The additive may include, for example, one or more of carbon nanotubes, carbon black, graphene, or metal nanoparticles. For example, 1% to 20% by weight, 5% to 10% by weight, or about 5% by weight of silver nano-particles with a surface area around 20 $m^2$ are added to the $CF_x$ material to improve the conductivity of the $CF_x$. In another example, 1% to 20% by weight, 5% to 10% by weight, or about 5% by weight of aluminum nano-particles with a surface area around 50 $m^2$ are added to the $CF_x$ material to improve the conductivity of the $CF_x$.

CONCLUSION

Exemplary embodiments of the present systems and methods have been presented. The systems and methods are not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the systems and methods herein.

Further, the purpose of the Abstract provided herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present system and method in any way.

What is claimed is:

1. A battery comprising:
an anode;
an electrolyte; and
a cathode comprising:
a current collector having a first surface and a second surface opposite the first surface;
a composite including a plurality of material layers, each material layer having a pair of major surfaces separated by a thickness, the composite being oriented with the major surfaces of each of the material layers perpendicular to the first surface of the current collector, the plurality of material layers including:
a first material layer comprising sub-fluorinated carbon fluoride having a chemical formula ($CF_x$), and
a second material layer comprising silver vanadium oxide (SVO) bonded to one of the major surfaces of the first material layer; and
a third material layer comprising silver vanadium oxide (SVO), the third material layer having a pair of major surfaces separated by a thickness, the third material layer being positioned so that one of the major surfaces of the third material layer confronts the first surface of the current collector and another of the major surfaces of the third material layer confronts the first and second material layers.

2. The battery of claim 1, wherein the cathode further comprises a fourth material layer comprising sub-fluorinated carbon fluoride having the chemical formula ($CF_x$) bonded to the second surface of the current collector, and a fifth material layer comprising silver vanadium oxide (SVO) bonded to the fourth material layer.

3. The battery of claim 1, wherein the current collector has a mesh structure, and the first surface and the second surface of the current collector are opposite surfaces of the mesh structure.

4. The battery of claim 1, wherein x in the chemical formula ($CF_x$) is between 0.6 and 1.2.

5. The battery of claim 1, wherein the first material layer further comprises an additive chosen from the group consisting of: carbon nanotubes, graphene, and metal nanoparticles.

6. The battery of claim 1, wherein the first material layer further comprises between 1% and 20% by weight of silver nanoparticles or aluminum nanoparticles based on a weight of the first material layer.

7. The battery of claim 1, wherein the thickness of the second material layer is about one third the thickness of the first material layer.

8. A cathode within a battery, the cathode comprising:
a current collector having a first surface and a second surface opposite the first surface;
a composite including a plurality of material layers, each material layer having a pair of major surfaces separated by a thickness, the composite being oriented with the major surfaces of each of the material layers perpendicular to the first surface of the current collector, the plurality of material layers including:
a first material layer comprising sub-fluorinated carbon fluoride having a chemical formula ($CF_x$), and
a second material layer comprising silver vanadium oxide (SVO) bonded to one of the major surfaces of the first material layer; and
a third material layer comprising silver vanadium oxide (SVO), the third material layer having a pair of major surfaces separated by a thickness, the third material layer being positioned so that one of the major surfaces of the third material layer confronts the first surface of the current collector and another of the major surfaces of the third material layer confronts the first and second material layers.

9. The cathode of claim 8, further comprising a fourth material layer comprising sub-fluorinated carbon fluoride having the chemical formula ($CF_x$) bonded to the second surface of the current collector, and a fifth material layer comprising silver vanadium oxide (SVO) bonded to the fourth material layer.

10. The cathode of claim 8, wherein the current collector includes a mesh, and the first surface and the second surface of the current collector are opposite surfaces of the mesh.

11. The cathode of claim 8, wherein x in the chemical formula ($CF_x$) is between 0.6 and 1.2.

12. The cathode of claim 8, wherein the first material layer comprises an additive chosen from the group consisting of: carbon nanotubes, graphene, and metal nanoparticles.

13. The cathode of claim 8, wherein the first material layer comprises between 1% and 20% by weight of silver nanoparticles or aluminum nanoparticles based on a weight of the first material layer.

14. The cathode of claim 8, wherein the thickness of the second material layer is about one third the thickness of the first material layer.

15. A cathode within a battery, the cathode comprising:
a current collector having a first surface and a second surface opposite the first surface;
a first material layer comprising sub-fluorinated carbon fluoride having a chemical formula ($CF_x$, the first material layer having first and second major surfaces separated by a thickness, and a plurality of bores extending through the thickness of the first material layer from the first major surface to the second major surface, the first major surface of the first material layer being bonded to the first surface of the current collector; and
a second material comprising silver vanadium oxide (SVO) that fills the plurality of bores in the first material layer.

16. A method of fabricating an electrode, comprising:
forming a composite by bonding a first material layer comprising sub-fluorinated carbon fluoride having a chemical formula ($CF_x$) to a second material layer comprising silver vanadium oxide (SVO), each of the first material layer and the second material layer having a pair of major surfaces separated by a thickness, the second material layer being bonded to one of the major surfaces of the first material layer;
bonding a third material layer comprising silver vanadium oxide (SVO) to a surface of a current collector, the third material layer having first and second major surfaces separated by a thickness, the third material layer being bonded so that the first major surface of the third material layer confronts the surface of the current collector; and bonding the composite to the third material layer so that the second major surface of the third material layer is in contact with the composite and the major surfaces of the first and second material layers are perpendicular to the surface of the current collector.

17. The method of claim 16, wherein the forming step comprises:

casting the second material layer on a substrate;

casting the first material layer over the second material layer to form the composite; and removing the composite from the substrate.

18. The method of claim 16, wherein the forming step comprises:

casting the first material layer on a substrate;

casting the second material layer over the first material layer to form the composite; and removing the composite from the substrate.

19. The method of claim 16, wherein the forming step comprises:

dipping the first material layer in a slurry comprising SVO such that at least one of the major surfaces of the first material layer is coated with the slurry; and drying the slurry coated first material layer to form the second material layer bonded to the one major surface of the first material layer.

20. The method of claim 16, further comprising forming the first material layer, wherein the step of forming the first material layer includes mixing carbon nanotubes, graphene, or metal nanoparticles with the sub-fluorinated carbon fluoride.

* * * * *